Dec. 8, 1931.   A. H. AULER   1,835,584
TIME INDICATOR FOR MOTOR VEHICLES
Filed Nov. 2, 1929   2 Sheets-Sheet 1
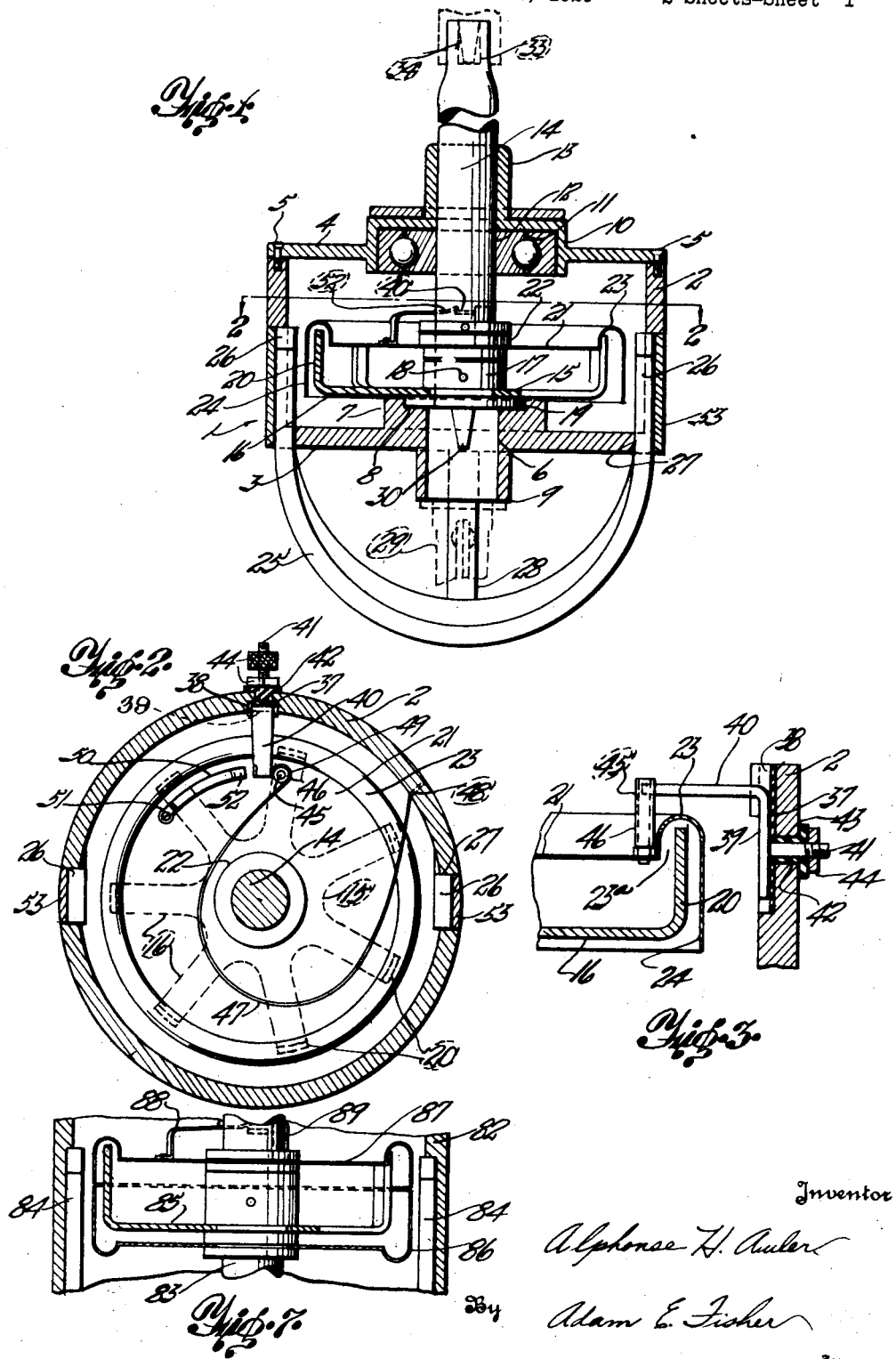

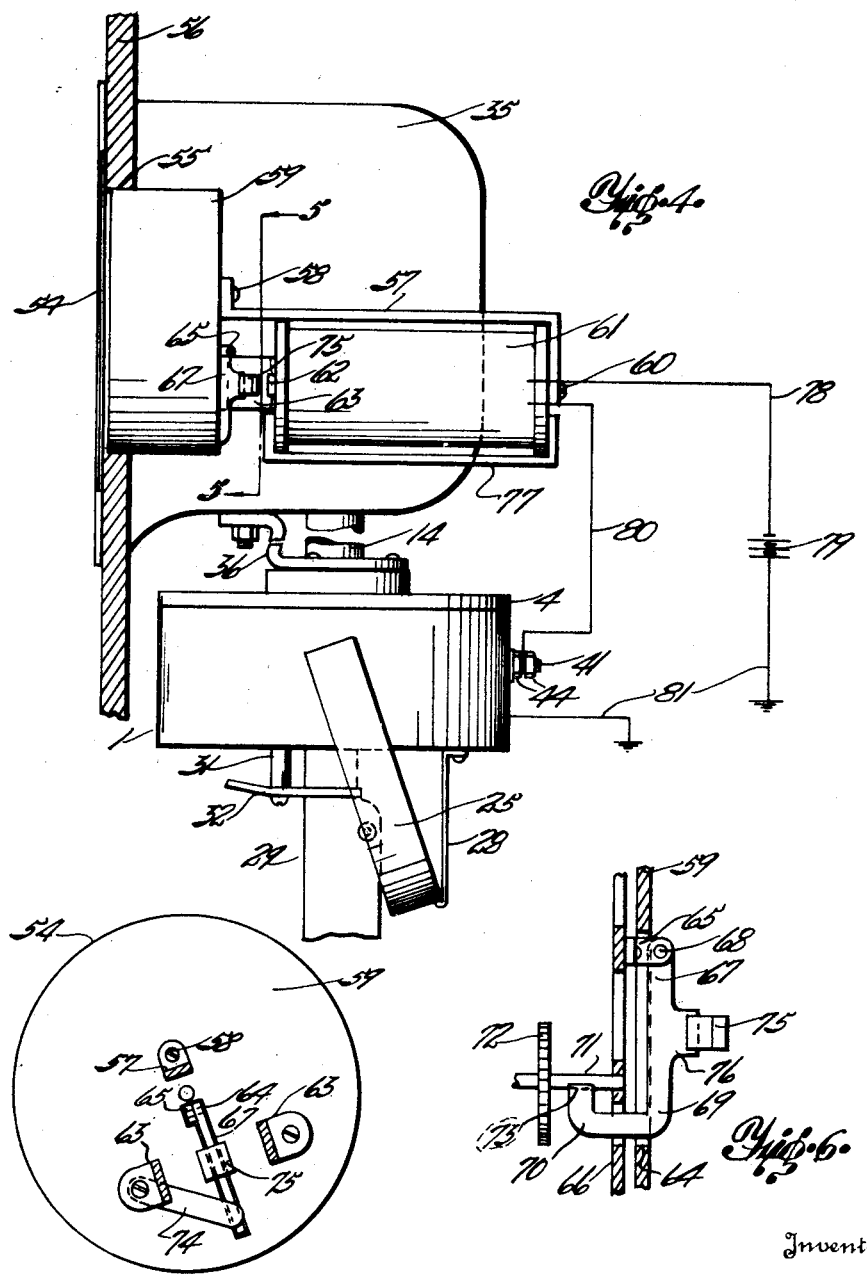

Patented Dec. 8, 1931

1,835,584

UNITED STATES PATENT OFFICE

ALPHONSE H. AULER, OF ST. LOUIS, MISSOURI

TIME INDICATOR FOR MOTOR VEHICLES

Application filed November 2, 1929. Serial No. 404,417.

This invention is a time indicator for motor vehicles and the main object is to provide a means for indicating the elapsed time in which the vehicle is actually in use.

Another object is to provide an improved and simple form of controlling switch for the time indicator which may be readily interposed between the speedometer or odometer drive shaft and the speedometer and odometer, the controlling switch being thus driven directly from the wheels of the vehicle by the drive shaft already incorporated in the vehicle and interfering in no way with the usual operation of the speedometer itself.

Another object is to provide a time indicator including a simple and efficient electrically operated braking means which is energized by the battery in the vehicle and which may be readily applied to the conventional form of dash clock to hold the same inoperative when the vehicle is not in motion.

A further object is to provide a controlling switch of such construction that it may be incorporated in the speedometer mechanism in lieu of the aforesaid arrangement of the switch between the speedometer shaft and speedometer, if so desired.

The foregoing and other objects together with means whereby the same may be carried into effect will best be understood from the following description of the invention taken in connection with the accompanying drawings wherein:

Figure 1 is a longitudinal section of the controlling switch alone.

Figure 2 is a section along the line 2—2 in Figure 1.

Figure 3 is an enlarged sectional detail of the switch contacts and associated elements.

Figure 4 is a side view of the controlling switch mounted on the speedometer and showing the braking means for the time indicator mounted in place upon the dash clock.

Figure 5 is an enlarged section along the line 5—5 in Figure 4.

Figure 6 is an enlarged sectional detail of a portion of the dash clock showing the brake lever mounted therein.

Figure 7 is a sectional detail view showing the switch associated with a speedometer of conventional type.

Throughout the following specifications and claims, wherever an automobile speedometer is referred to, this term shall be taken to include also the usual odometer, which is generally associated and forms a part of the speedometer mechanism.

Referring now more particularly to the drawings the controlling switch mechanism comprises a circular case or shell 1 having the annular wall 2, the lower end of the case being closed by the integrally formed bottom 3 and the upper end by the removable top 4 held in place by screws 5 threaded into the upper edge of the wall 2. The bottom 3 is provided with a central aperture 6, and a seating ring or shoulder 7 having the countersunk seat 8 is provided around this aperture within the case. A tubular stem 9 is also provided on the lower side of the bottom 3 in alignment with the said aperture 6. The top 4 is provided with a suitable centrally located housing 10 in which is seated a conventional ball bearing 11, the inner race thereof having a shaft aperture 12. The said housing 10 is extended upwardly in the form of a tubular stem 13, the bore of which registers with the aperture 12 in the ball bearing 11. A shaft 14 is journaled loosely through the stem 13 downwardly into the case 1, the lower end thereof terminating in horizontal alignment with the seat 8 as shown, and the inner race of the ball bearing 11 is secured to this shaft to turn therewith in the usual manner. A steel or iron spider 15 having an odd number of radially extended arms 16 is provided with a hub 17 which is fixed to the lower end of the shaft 14 by a pin 18, the underside of this hub being diametrically enlarged at 19 and so adapted to rotatably seat in the seat 8, thus supporting the shaft 14. Each of the arms 16 has its end bent upwardly as shown at 20 for a purpose to be described. A contact carrier 21 is provided, the same having a hub 22 journaled freely on the shaft 14, and resting upon the hub 17 of the spider 15. The outer periphery of this contact carrier 21 is curved upwardly and outwardly as shown at 23 and then downwardly to form the annular depending flange 24, the said carrier being so formed and mounted that this flange 24 extends down over the upturned ends 20 of the spider arms 16, in spaced relationship thereto; the upper extremities of these upturned ends 20 extending up into the recess 23a provided by the curved confirmation 23 of the rim of the contact carrier, as shown. A U-shaped or horseshoe permanent magnet 25 is inverted and has its ends 26 passed through the base 3 and seated in diametrically opposite recesses 27 formed in the wall 2, the said ends 26 extending within the case 1 in spaced relationship to the carrier 21 and being held in place by fastening blocks 53 seated in the recesses 27 against the outer side of the ends 26 of the magnet, and soldered or otherwise secured in place. A bracket 28 is depended from the bottom 3 of the case 1 to further hold the magnet in position. It will be noted that the magnet 25 is seated in the case at an angle from the vertical so that it will clear the conventional speedometer drive shaft generally indicated at 29 which enters the aperture 6 and engages a tapered depending shank 30 formed on the lower end of the shaft 14, the shaft 14 being thus rotated by this drive shaft 29. A stud 31 is secured to the underside of the bottom 3, and the usual attaching bracket 32, provided on the speedometer drive shaft is secured to this stud as shown. The upper end of the shaft 14 is extended from the case 1 and is provided with a socket 33 adapted to receive the tapered shank 34 driving the speedometer 35 to which the case 1 is secured by a bracket 36 secured to the top 4 and encircling the stem 13 and bolted to the speedometer case as shown. The shaft 14 thus serves to drive the speedometer mechanism and does not interfere in any way with the usual operation of such mechanism.

A recess 37 is provided in the inner face of the wall 2 of the case 1 and an insulating receptacle 38 is mounted in this recess to receive the contact 39 which is in the form of a right angle and has its horizontally disposed arm 40 extended out over the contact carrier 21. A threaded connecting stud 41 is secured to the contact 39 and extends out of the case through an insulating bushing 42 mounted in an aperture 43 through the wall 2, and is provided at its outer end with nuts 44 to clamp a wire (not shown) in place. A stop post 45 is extended vertically upward from the contact carrier 21 near its outer margin and is insulated by a sleeve 46 of fibre or similar insulating material. A fine wire spring 47 is secured at 48 to the wall 2 of the case 1 and is bowed around the shaft 14 and hooked over the stop 45 at 49, so that this stop is normally held against the inner end of the arm 40 of the contact 39 as shown. A contact 50 is provided upon the contact carrier 21 adjacent its outer periphery in electrical connection therewith, this contact in its preferred form being made of spring material secured at 51 to the carrier 21, bent upwardly and then horizontally into substantially horizontal alignment with the contact 39. The contact 50 is thus adapted to engage the contact 39 upon a slight rotation of the carrier 21, the end of this contact 50 being bent upwardly somewhat at 52 to meet the contact 39 at an angle and so prevent the carrier from jarring or jerking backward as the contacts engage, as will be understood.

In the operation of this switch mechanism the shaft 14 is rotated by the speedometer drive shaft 29 when the vehicle is in motion and the spider 15 is carried around by this shaft 14. The magnetic field between the ends of the permanent magnet 25 is thus partially rotated by the continuous rotation of the upturned ends 20 of these arms 16 past the ends of the magnet 25 and an induced current is set up in the flange 24 of the contact carrier 21 causing it to move with the spider 15. The contact carrier is for this reason constructed of aluminum or analogous material to keep its inertia as low as possible. This principle of operation is the same as that used in the magnetic speedometer and the induction motor and it is thought that no further description is necessary. The contact 50 upon the contact carrier 21 is thus brought into contact with the contact 39 upon the wall of the case 1 and is held in engagement therewith by the constant drag on the carrier 21 as will be understood. As soon as the vehicle comes to a stop the spider 15 ceases its rotation and the spring 47 rotates the contact carrier 21 backward until the stop post 45 rests against the contact 39.

Referring to Figure 4 the reference numeral 54 designates a dash clock of conventional form which is secured in place in an aperture 55 in the dash 56, the aforesaid speedometer 35 also being shown in place upon the dash 56. Any arrangement of the speedometer and clock upon the dash may be used. A bracket 57 is secured at 58 to the back 59 of the clock and extends therefrom and is secured at 60 to the end of an electromagnet 61 of conventional form, the electromagnet being thus held with its core 62 at right angles to the back of clock and spaced therefrom as shown. Another bracket 63 is secured to the forward end of the electromagnet and to the back of the clock to hold the magnet firmly in place. A slot 64 is provided through the back 59 of the clock and a bearing 65 is secured to the frame 66 of the clock mechanism and extends out through this slot 64 near one end thereof. A brake lever 67 is pivoted at 68 to the bearing 65 and has its free end bent inwardly at 69 and passed through the slot 64 and frame 66 into the clock mechanism, the end of the lever being then bent at 70 back again toward its pivoted end, as shown. The slot 64 and the brake lever 67 are so positioned that this end 70 of the lever is disposed adjacent the spindle 71 carrying the balance wheel 72 or any other suitable part of the clock mechanism, and a V slot 73 is provided in the end 70 of the brake lever adapted to embrace this spindle 71, and the brake lever 67 is held in this position by means of a flat spring 74 secured under one leg of the bracket 63 and bearing upon the brake lever as shown. A block 75 of iron or other metal subject to attraction by a magnet is secured to a lug 76 extended from the brake lever 67 at a point intermediate its pivoted end and the inwardly turned portion of the lever, the said block 75 extending into proximity to the core 62 of the electromagnet 61. A U-shaped member 77 is secured by its ends to the electromagnet 61 as shown, this member serving to increase the effective magnetism in a well known manner.

In wiring the switch and clock mechanisms one lead 78 of the electromagnet 61 is connected directly to one terminal of the battery 79 and the other lead 80 of the electromagnet is connected to the contact 39 through the stud 41. The case 1 and the other terminal of the battery 79 are grounded as indicated by the wires 81, or connected together according to which system is used on the vehicle carrying the switch and clock. It will thus be understood that the circuit to the electromagnet 61 will be completed when the contacts 39 and 50 come into engagement as hereinbefore pointed out.

As hereinbefore pointed out the contacts 39 and 50 are held in engagement while the vehicle is in motion therefore the electromagnet 61 is energized during this time. This electromagnet 61 when energized serves to attract the block 75, pulling upon the brake lever 67 and causing the end 70 of this lever having the slot 73 to release the spindle 71 allowing the clock 54 to run, and indicate the time the vehicle is in use. When the vehicle stops the contacts 39 and 50 are disengaged opening the circuit to the electromagnet 61 and allowing the spring 74 to force the lever 67 inward to exert a braking action upon the spindle 71 and stop the clock.

If so desired the switching mechanism controlling the electromagnet 61 may be mounted in the speedometer itself in lieu of using a separate casing therefor and this arrangement is illustrated in Figure 7 of the drawings. In this view 82 designates the speedometer case, 83 the rotating shaft, 84 the ends of the permanent magnet, and 85 the spider. The revolving drum 86 carrying the scale which indicates the speed of the vehicle is mounted as shown and surrounds the spider 85. The contact carrier 87 is mounted over the spider 85 above the drum 86 and carries the contact 88 and stop 89 arranged exactly as hereinbefore set forth. The operation of this embodiment is identical with the operation of the switch mechanism before described and it will be readily apparent that the mounting of this extra contact carrier 87 in the speedometer case will not interfere with the usual operation of the scale bearing drum 86 of the speedometer.

While I have herein set forth a certain preferred embodiment of the invention it is understood that I may vary from the same in minor structural details, not departing from the spirit of the invention and within the scope of the appended claims. For example, it is obvious that the described elements could be so arranged and adjusted that the clock mechanism would be stopped only while the automobile were in motion and would be allowed to run only while the automobile were at rest.

Similarly, while the embodiment of the invention herein described is shown in combination with a magnetic speedometer wherein the magnet is fixedly mounted and the spider is rotatably mounted, it is apparent that this arrangement might be reversed and in some forms of magnetic speedometers is reversed, and that the magnet may be rotatably mounted and the spider fixedly mounted, without altering in any way the function of the assembly and without departing from the spirit of my invention. In either case both the scale drum and the contact carrier moves independently.

I claim:

1. The combination with a magnetic speedometer for an automobile, the same including in conventional form a casing, a permanent U-shaped magnet in the casing, a rotatable shaft extended into the casing between the poles of the magnet, a spider rigidly mounted upon the shaft between the poles of the magnet, and a scale drum rotatably carried by the shaft and enclosing the said spider, of a contact carrier also rotatably carried by the said cable, the said contact carrier being substantially similar to the said scale drum and being oppositely disposed thereto upon the said cable between the poles of the said magnet, a clock mechanism, and electro-magnetic means for controlling the clock mechanism, the said electro-magnetic means being in turn controlled through the said contact carrier.

2. The combination with a magnetic speedometer for an automobile, the said speedometer including in conventional form a permanent U-shaped magnet, a rotatable shaft extended between the poles of the magnet, a spider rigidly mounted upon the shaft between the poles of the magnet, and a scale drum freely carried by the shaft and having a flange turned to partially enclose the said spider, of a contact carrier similar to the said scale drum and similarly and oppositely mounted thereto upon the said cable between the poles of the magnet and likewise having a flange turned to partially enclose the said spider at the opposite side from the said scale drum, a clock mechanism, a brake for the clock mechanism, electro-magnetic means for controlling the said brake, and cooperating electrical contacts and connections, one of the said contacts being mounted upon the said contact carrier and adapted upon the rotation thereof to close the circuit through the said electro-magnetic brake controlling means.

3. In combination, a magnetic speedometer for an automobile or the like, the said speedometer including in conventional form a casing, a U-shaped magnet having its poles extended into the casing, a shaft journaled into the casing between the poles of the magnet, a spider rigidly mounted upon the shaft inside the casing and between the poles of the magnet, a scale drum journaled upon the shaft inside of the casing and having an outer flange turned so as to partially enclose the said spider, a contact carrier similar to the said scale drum, the same being similarly and oppositely mounted relative to the scale drum upon the said casing and likewise having its outer flange turned to partially enclose the said spider at the opposite side thereof from the said scale drum, a clock mechanism, a brake for the clock mechanism, an electro-magnet for controlling the said brake, an electrical contact upon the speedometer casing, a cooperating electrical contact upon the said contact carrier, a source of electrical energy, electrical conductors operatively connecting the said electro-magnet with the said source of electrical energy and the said contacts, and means for normally holding the said contacts asunder when the automobile is at rest.

4. In combination with a magnetic speedometer embodying a magnet, a spider rotatably mounted between the poles of the magnet, and a scale drum partially enclosing the said spider and adapted to rotate independently thereof, a member complementary to the said scale drum similarly partially enclosing the said spider and adapted to rotate independently thereof and of the said scale drum, a clock mechanism, and means associated with the said member complementary to the scale drum for controlling the said clock mechanism.

In testimony whereof I affix my signature.

ALPHONSE H. AULER.